United States Patent
Vasiljev et al.

(10) Patent No.: US 7,578,142 B2
(45) Date of Patent: Aug. 25, 2009

(54) METHOD FOR RECOVERING THE ENERGY OF GAS EXPANSION AND A RECOVERY DEVICE FOR CARRYING OUT SAID METHOD

(76) Inventors: Vladimir Yarslavovich Vasiljev, Ul Krasnoputlovskaya, 99-37, St. Petersburg (RU) 196240; Oleg Mikhailovich Kiselev, Joseph Oergen Weg, 80, Essen (DE) 45327

( * ) Notice: Subject to any disclaimer, the term of this patent is extended or adjusted under 35 U.S.C. 154(b) by 121 days.

(21) Appl. No.: 10/344,486

(22) PCT Filed: Aug. 15, 2001

(86) PCT No.: PCT/RU01/00351

§ 371 (c)(1),
(2), (4) Date: Feb. 11, 2003

(87) PCT Pub. No.: WO02/14662

PCT Pub. Date: Feb. 21, 2002

(65) Prior Publication Data
US 2003/0172661 A1    Sep. 18, 2003

(30) Foreign Application Priority Data
Aug. 16, 2000    (RU)    ............................... 2000121361

(51) Int. Cl.
 *F25D 9/00* (2006.01)
 *F01K 7/34* (2006.01)
 *F01K 7/22* (2006.01)
(52) U.S. Cl. .............................. 62/402; 60/653; 60/679
(58) Field of Classification Search ..................... 62/86, 62/87, 401, 402; 60/653, 679, 671, 677
See application file for complete search history.

(56) References Cited

U.S. PATENT DOCUMENTS

| | | | | |
|---|---|---|---|---|
| 3,358,460 A | * | 12/1967 | Smith et al. .................... | 62/649 |
| 3,998,059 A | * | 12/1976 | Randell ........................ | 60/659 |
| 4,231,226 A | * | 11/1980 | Griepentrog .................. | 60/648 |
| 4,330,998 A | * | 5/1982 | Nozawa ........................ | 60/655 |
| 4,372,124 A | * | 2/1983 | Newton et al. ................. | 60/648 |
| 4,444,015 A | * | 4/1984 | Matsumoto et al. ........... | 60/648 |

(Continued)

*Primary Examiner*—William C Doerrler
(74) *Attorney, Agent, or Firm*—John D. Gugliotta, Pe, Esq.

(57) ABSTRACT

The proposed method and the installation are intended for application in systems of reduction of natural gas from high—e.g. in a borehole or in a main pipeline down to the pressure value required for the consumer.

The essence of the proposed method is that in the known method of utilization of natural gas energy in the process of gas pressure drop from increased, e.g. in a gas main pipeline down to the required value by conversion of natural gas expansion energy to mechanical energy with the aid of the gas cooled down in the process of pressure drop as a cooling agent, the innovation is multi-stage gas pressure drop and multi-stage take-off of generated cold.

The essence of the proposed method is that a utilization power installation the inlet of which is connected to high pressure gas borehole or main pipeline (3) and the outlet—to low pressure natural gas pipeline or to low pressure natural gas consumer (7, 9), comprises a gas expansion machine (e.g. expansion gas turbine) consisting of two or more components (1, 2), arranged in the direction of pressure drop, converter (4) of mechanical energy, e.g. an with the gas expansion machineOM, and two or more heat exchangers (6, 8).

14 Claims, 2 Drawing Sheets

U.S. PATENT DOCUMENTS

| | | | |
|---|---|---|---|
| 5,634,340 A | * | 6/1997 | Grennan ..................... 60/652 |
| 6,131,407 A | * | 10/2000 | Wissolik ..................... 62/606 |
| 6,196,021 B1 | * | 3/2001 | Wissolik ..................... 62/606 |
| 6,269,656 B1 | * | 8/2001 | Johnston ..................... 62/613 |

* cited by examiner

METHOD FOR RECOVERING THE ENERGY OF GAS EXPANSION AND A RECOVERY DEVICE FOR CARRYING OUT SAID METHOD

FIELD OF THE INVENTION

The proposed method and the installation are intended for application in systems of reduction of natural gas from high—e.g. in the borehole or in main pipelines down to the pressure value required for the consumer.

BACKGROUND OF THE INVENTION

The known methods of reduction of pressure of gas in boreholes or in main pipelines are based on throttling and using special devices (pressure regulators, valves, cocks etc) for implementation of these methods. [Polytechnic Dictionary, Moscow, "Sovetskaya Entsiklopedia" Publishing House, 1977, pp. 153, 420]

These methods and devices for implementation thereof do not utilize energy of gas expansion and cold generated during this process. The application of these methods and devices requires sophisticated equipment and consumption of additional power to prevent clogging of pressure regulators by moisture and ice generated during their operation.

A method of utilization of energy of natural gas when its pressure drops from the value in the main pipeline or in the borehole down to the required pressure by conversion of gas expansion energy to mechanical energy is known. [RU 2117173, MIIK 6 F 02 C 1/02, 1996]. This method is implemented in a utilization power installation the inlet of which is connected to the outlet of the high pressure gas borehole or the main pipeline and the outlet—to the low pressure gas pipeline or to the gas consumer. This utilization power installation includes a gas expansion machine, e.g. an expansion turbine, and a mechanical energy converter connected kinematically with the gas expansion machine, e.g. an electric generator. Such method and the installation make it possible to utilize gas expansion energy when its pressure drops.

However this method and the installation do not provide the possibility of utilization of: cold generated in the process of gas expansion. The efficiency of this method and the installation is low.

There is a method of utilization of gas expansion energy when the gas pressure drops from a high value to the required one by conversion of gas expansion energy to mechanical energy with simultaneous utilization of the gas cooled down during pressure drop as a cooling agent for generation of cold. [SU, A1, 844797]

However this method provides a single-stage gas pressure drop and hence total efficiency thereof is reduced.

There is a power installation for utilization of gas expansion energy and the cold generated during this process. [RU 2013616, MIIK F 02 C 6/00, 1994]

However efficiency of this installation is low as gas pressure reduction and utilization of cold are effected at a single stage.

DISCLOSURE OF THE INVENTION

The object of this invention is to improve utilization of cold generated during the process of reduction of natural gas pressure; generation of great amount of energy and cold and to increase total efficiency of the method and the installation for utilization of natural gas expansion energy.

The problem set in the proposed method is solved by reduction of natural gas from high—e.g. in main pipelines down to the pressure value required for the consumer by conversion of gas expansion energy to mechanical energy by using the gas cooled down in the process of gas pressure drop as a cooling agent. The innovation of this method is reduction of natural gas pressure in two or more successive stages and simultaneous utilization of at least a part of gas after the first and/or after each respective subsequent stage of reduction of natural gas pressure as a cooling agent for generation and use of cold. Another part of natural gas after the first and/or after each respective subsequent stage of reduction of natural gas pressure or the total amount of natural gas used as a cooling agent is used at the next stage of conversion of natural gas expansion energy to mechanical energy.

Due to application of the stage-by-stage reduction of natural gas pressure and the use of the total amount or a part of natural gas after the first and/or after the relevant subsequent stage of natural gas pressure drop the total efficiency of the method increases.

The problem set in the proposed machine is solved by implementation of a installation for utilization of natural gas expansion energy that includes a gas expansion machine, e.g. an expansion turbine, inlet of which is connected to a high pressure gas borehole or main pipeline and the outlet—to a low pressure gas pipeline; a gas expansion machine, e.g. an expansion turbine and a mechanical energy converter connected kinematically with the gas expansion machine, e.g. an electric generator. There is at least one heat exchanger in this installation, the outlet branch pipe of which is connected to the outlet of the gas expansion machine, e.g. to the, outlet of the expansion turbine.

The innovation introduced in this facility is that the gas expansion machine of the utilization power installation, e.g. the expansion turbine, consists of two or more components arranged in the direction of natural gas pressure drop; the installation also comprises two or more heat-exchangers—refrigerators; the inlet branch pipe from the coolant side of each heat-exchanger—refrigerator is connected to the outlet of the relevant component of the expansion machine and the number of heat-exchangers—refrigerators is not less than the number of expansion machine components.

This improvement of the utilization power installation ensures the increase of efficiency of this installation and the amount of generated cold.

The outlet of the preceding component of the gas expansion machine of the utilization power installation can be connected simultaneously both to the inlet of the next component of the gas expansion machine, and to the inlet branch pipe from the cooling agent side of the relevant heat exchanger-refrigerator, and the outlet branch pipe from the cooling agent side of one or more heat exchanger-refrigerators—to the low pressure gas pipeline or the gas consumer. In this case the flow of the working medium branches out and a part of the working medium is taken off for utilization of cold. This improves the thermo-dynamical working cycle of the installation.

Such an improvement increases the efficiency of the installation. At the same time it becomes possible to optimally regulate the operation of the gas expansion machine when the operation mode changes.

In the utilization power installation proposed the outlet of the preceding component of the gas expansion machine can only be connected to the inlet branch pipe from the cooling agent side of one or each heat exchanger-refrigerator, located between two components of the gas expansion machine, and the outlet branch pipe from the cooling agent side of the same heat exchanger-refrigerator, located between the two components of the gas expansion machine, can be connected to the inlet of the working medium of the next component of the gas expansion machine. Then additional heating of the working medium (gas) occurs in one or in each heat exchanger-refrigerator. It improves thermo-dynamical working cycle of the installation.

This improvement increases additionally the efficiency of the installation and by utilization of the heat of the cooling agent, heated due to heat exchange in the heat exchanger-refrigerator. At the same time it becomes possible to optimally regulate the operation of the gas expansion machine when the operation mode changes by changing the amount and/or the temperature of the working medium (liquid, gas or several working mediums) heated in the heat exchangers-refrigerators.

BRIEF DESCRIPTION OF DRAWINGS

In DWG. 1 the diagram of a utilization power installation is shown. The installation includes an expansion gas turbine that contains a high pressure component and a low pressure component, two heat exchangers-refrigerators and an electric generator.

In DWG. 2 the diagram of a utilization power installation is shown. The installation includes an expansion gas turbine that contains a high pressure component, a medium pressure component and a low pressure component, three heat exchangers-refrigerators and an electric generator.

Figure 1:
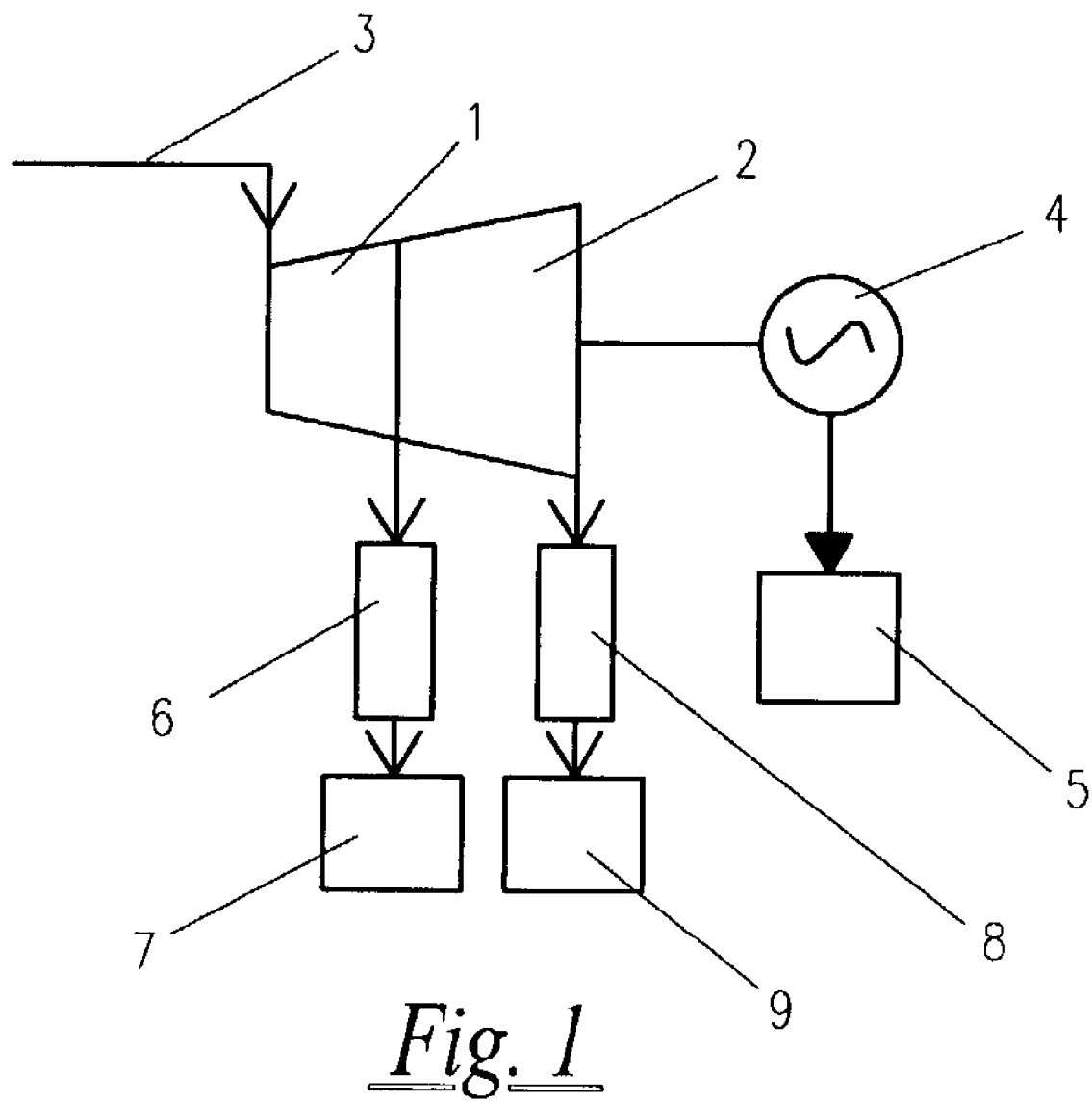
Figure 2:
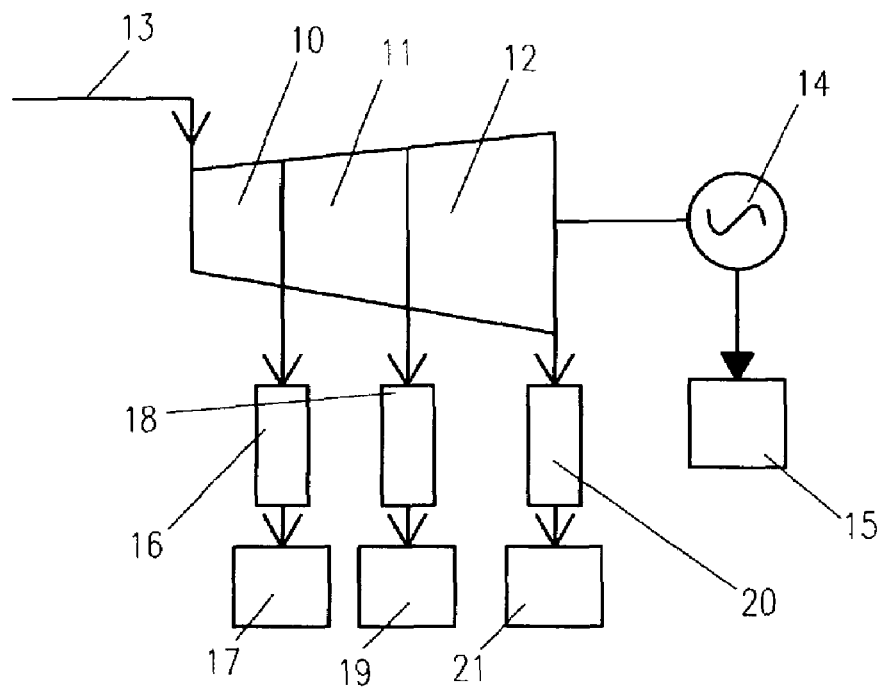
Figure 3:
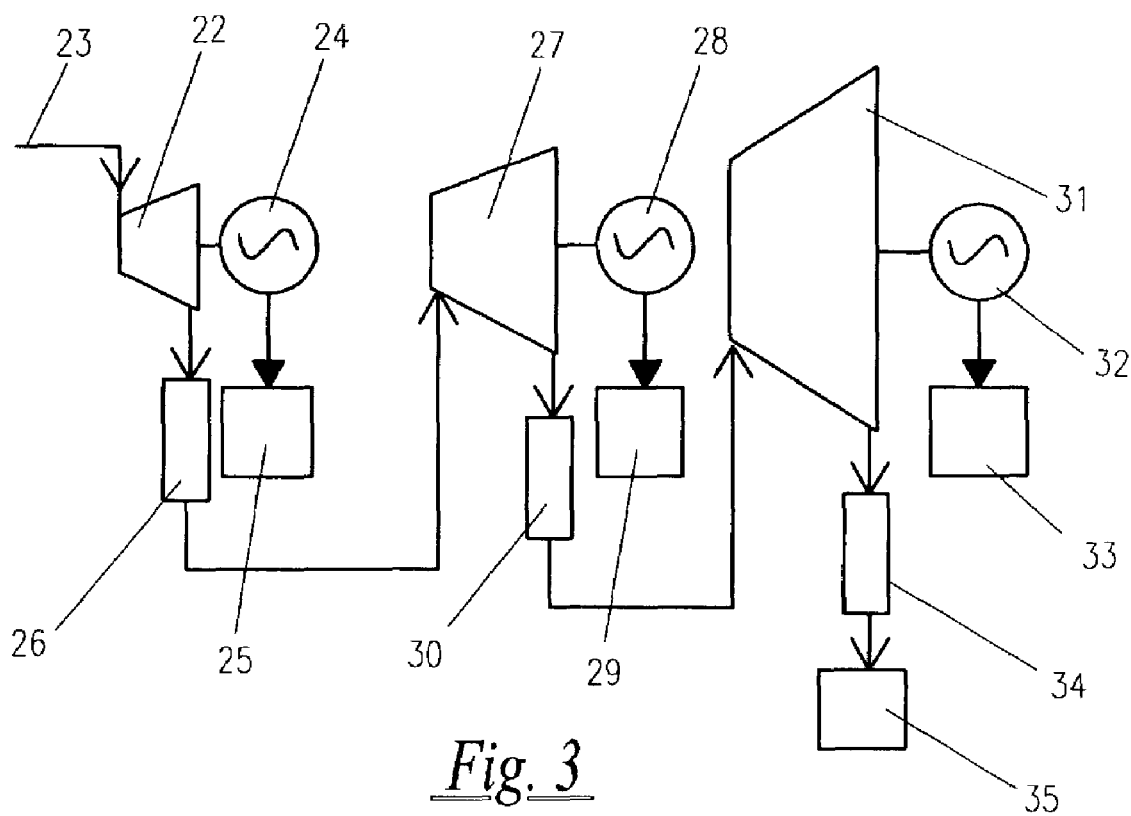

In DWG. 3 the diagram of a utilization power installation is shown. The installation includes expansion gas turbines that contain high pressure components, medium pressure components and low pressure components, three heat exchangers-refrigerators and three electric generators.

The invented method and the installation are illustrated by descriptions of the preferred embodiments thereof the embodiments of implementation of the utilization of gas expansion energy being described in the disclosure of operation of variants of the installation.

Variant 1. (DWG.1)

The utilization power installation includes an expansion gas turbine that contains high pressure, components 1(HPC 1), and low pressure components 2 (LPC 2) arranged co-axially. The inlet of HPC 1 is connected to high pressure gas main pipeline 3. This main pipeline 3 can be a high- or medium-pressure natural gas pipeline, a gas pipeline of the gas distribution station, a thermal power station, a boiler house, a borehole in the natural gas production site etc. (These facilities are not shown in the drawings). Electric generator shaft 4 that supplies electric power to consumer 5 is connected kinematically or directly to the common shaft of HPC 1 and LPC 2. The outlet of HPC 1 is connected both to the inlet of LPC 2, and the inlet branch pipe from the cooling agent side of heat exchanger-refrigerator 6. The outlet of the branch pipe from the cooling agent side of heat exchanger-refrigerator 6 is connected to the low pressure gas pipeline through which gas is supplied to consumer 7.

Heat exchanger-refrigerator 8 is installed at the gas outlet of LPC 2 of the expansion gas turbine. The inlet branch pipe of the heat exchanger-refrigerator from the cooling agent side is connected to the gas outlet out of LPC 2 of the expansion gas turbine and the outlet branch pipe from the cooling agent side of the heat exchanger-refrigerator 8 is connected to the low pressure gas pipeline, that supplies gas to consumer 9.

The utilization power installation operates in the following way. High pressure natural gas flows out of main pipeline 3 into HPC 1, rotates the same expanding and cooling at the same time. A part of this natural gas flows into LPC 2, another part—into the inlet branch pipe from the cooling agent side of heat exchanger-refrigerator 6. Partially cooled down gas under partially reduced pressure passes through heat exchanger-refrigerator 6. Next the natural gas under required pressure is supplied to gas consumer 7.

Another part of gas that was delivered into LPC 2 of the expansion gas turbine performs additional work, reduces pressure and is cooled down. This gas is fed from LPC 2 to the second heat exchanger-refrigerator 8, where gas is heated and cold is taken off. Next natural gas under reduced pressure is supplied to consumer 9. The expansion gas turbine that includes HPC 1 and LPC 2 rotates electric generator electric generator 4. Electric power is supplied to consumer 5.

Cold can be used for freezing chambers, ice rinks etc and for liquefaction of natural gas produced from boreholes. The useful work performed by gas in the process of expansion can also be used for liquefaction of gas and power supply of a remote natural gas borehole.

Variant 2. (DWG.2)

Utilization power installation includes an expansion gas turbine that contains high pressure component 10 (HPC 10), medium pressure component 11 (MPC 11) and low pressure component (LPC 12) that are arranged on the same shaft. The inlet of HPC 10 is connected to high pressure gas main pipeline 13. The outlet of HPC 10 is connected both to the inlet of MPC 11 and to the inlet branch pipe from the cooling agent side of heat exchanger-refrigerator 16. The gas outlet of heat exchanger-refrigerator 16 is connected to low pressure gas consumer 17. The outlet of MPC 11 is connected both to the inlet of LPC 12 and the inlet branch pipe from the cooling agent side of heat exchanger-refrigerator 18. The gas outlet from heat exchanger-refrigerator 18 is connected to low pressure gas consumer 19. The outlet of LPC 12 is connected to the inlet branch pipe from the cooling agent side of heat exchanger-refrigerator 20. The gas outlet from heat exchanger-refrigerator 20 is connected to low pressure gas consumer 21.

The utilization power installation operates in the following way. High pressure natural gas flows out of main pipeline 13 into HPC 10, rotates the same expanding and cooling at the same time. A part of this natural gas flows into MPC 11, rotates the same expanding and cooling at the same time, another part—into the inlet branch pipe from the cooling agent side of heat exchanger-refrigerator 16, from which natural gas is supplied to low pressure gas consumer 17. Pressure required to gas consumer 17 can be higher than that required to other natural gas consumers 19 and 21. Another part of the gas flow performs work in MPC 11, reduces pressure additionally and is cooled down. Next natural gas flow branches out. One part of this flow is fed to the inlet branch pipe from the cooling agent side of heat exchanger-refrigerator 18, from which natural gas is supplied to gas consumer 19. The rest part of the flow is fed to the inlet of LPC 12, rotating the same expanding and being cooled down at the same time. Then natural gas flows into heat exchanger-refrigerator 20, from which it is fed to low pressure natural gas consumer 21. The expansion gas turbine rotates electric generator 14, that generates current for electric power consumer 15.

Cold can be used for freezing chambers, ice rinks etc and for liquefaction of natural gas produced from boreholes. The useful work performed by gas in the process of expansion can also be used for liquefaction of gas and power supply of a remote natural gas borehole.

Variant 3. (DWG.3)

The utilization power installation includes high pressure expansion gas turbine 22 (HPT 22), the inlet of which is connected to high pressure natural gas pipeline 23. The shaft of HPT 22 is connected to electric generator 24 kinematically or directly the generator being electrically connected with power consumer 25. The outlet of HPT 22 is connected to the inlet branch pipe from the cooling agent side of heat exchanger-refrigerator 26. The gas outlet of heat exchanger-refrigerator 26 is connected to the inlet of the medium pressure expansion gas turbine 27 (MPT 27). The shaft of MPT 27 is connected kinematically or directly to electric generator 28, which is connected electrically to power consumer 29. The outlet of MPT 27 is connected to the inlet branch pipe from the cooling agent side of heat exchanger-refrigerator 30. The gas outlet of heat exchanger-refrigerator 30 is connected to the inlet of low pressure expansion gas turbine 31 (LPT 31). The shaft of LPT 31 is connected kinematically or directly to electric generator 32, which is connected electrically with power consumer 33. The outlet of LPT 31 is connected to the gas inlet of heat exchanger-refrigerator 34. The gas outlet of the heat exchanger-refrigerator 34 is connected to low pressure natural gas consumer 35.

The utilization power installation operates in the following way. High pressure natural gas is fed from main pipeline 23 to HPT 22, rotating the same, expanding and being cooled down. Next gas is supplied from HPT 22 to heat exchanger-refrigerator 26, where cold is utilized and gas is heated and expands. Further gas is delivered to MPT 27, rotating the same, expanding and being cooled down. Next gas flows into heat exchanger-refrigerator 30, where cold is utilized and gas is heated and expands. Then heated and expanded gas is fed from heat exchanger-refrigerator 30 to LPT 31 rotating the same, expanding and being cooled down. Next gas flows from LPT 31 to heat exchanger-refrigerator 34, where cold is utilized and natural gas is heated and expands. Further natural gas is supplied to low pressure gas consumer 35. HPT 22, MPT 27 and LPT 31 rotate electric generators 24, 28 and 32 respectively that supply electric power to consumers 25, 29, 33. Electric generators 24, 28 and 32 can be connected to the common electric network Due to stage-by-stage cooling down of gas in HPT 22, MPT 27 and LPT 31 and stage-by-stage heating of the same in heat exchangers-refrigerators 26 and 30 total efficiency of utilization power installation increases.

INDUSTRIAL APPLICABILITY

The invention can be used for solving a wide scope of practical problems of generation of additional energy and non-expensive cold. The invention can be used at the outlet of high pressure natural gas directly out of boreholes and for reduction of gas pressure at the outlet of main pipelines down to the pressure required by the consumer etc.

In all descriptions of preferred embodiments an expansion gas turbine is used as a gas expansion machine. However a gas expansion machine of any type can be used, e.g. piston or rotor—type gas expansion machines, including those comprising high pressure and low pressure components or high pressure, medium pressure and low pressure components.

Turbines, pumps, ventilators, winches or other converters of mechanical energy can be used instead and/or simultaneously with the electric generator.

Utilization power installations described in preferred embodiments of the invention utilization power installations can be located directly beside natural gas boreholes if natural gas pressure at the outlet of the borehole exceeds pressure required for the gas main pipeline. In this case cold can be used for liquefaction of natural gas produced. The useful work performed by gas in the process of expansion can be used for liquefaction of gas power supply of a remote natural gas borehole. The utilization power installations proposed are very efficient in places where gas main pipelines are connected to installations for natural gas supply to big consumers (electric power plants, domestic natural gas networks in settlements etc).

The invention claimed is:

1. A power installation comprising:
    a gas expansion means consisting of more than one gas expansion machine part arranged in the direction of natural gas pressure drop;
    at least one converter of mechanical energy having a rotor being connected kinematically with the rotor of at least one gas expansion machine;
    exchangers-refrigerators being not less than the number of the gas expansion machines; and wherein
    the first gas expansion machine has an inlet being connected to a high pressure natural gas source;
    the outlet of a preceding gas expansion machine is connected both to the inlet of the next gas expansion machine and to the inlet branch pipe on the cooling agent side of the corresponding exchanger-refrigerator;
    the outlet branch pipe on the cooling agent side of at least one exchanger-refrigerator is connected to a low pressure natural gas means.

2. A power installation comprising:
    a gas expansion means comprising a high pressure gas expansion machine and a low pressure gas expansion machine,
    the inlet of said high pressure gas expansion machine being connected to a high pressure natural gas source;
    wherein said high pressure gas expansion machine has an inlet, a first outlet and a second outlet, and said low pressure gas expansion machine has an inlet, a first outlet and a second outlet;
    a converter of mechanical energy having a rotor being connected kinematically with a rotor of at least one gas expansion machine;
    a first exchanger-refrigerator; and wherein
    the first outlet of the high pressure gas expansion machine is connected both to the inlet of the low pressure gas expansion machine and to the inlet branch pipe on the cooling agent side of the first exchanger-refrigerator; and
    the outlet branch pipe on the cooling agent side of the exchanger-refrigerator is connected to a low pressure natural gas means.

3. The power installation of claim 1, wherein the high pressure natural gas source is selected from the group comprising: a main pipeline, a high-pressure natural gas pipeline; a medium-pressure natural gas pipeline; a gas pipeline of a gas distribution station; a gas pipeline of a power station; a boiler house; and a borehole in the natural gas production site.

4. The power installation of claim 2, wherein the high pressure natural gas source is selected from the group comprising: a main pipeline, a high pressure natural gas pipeline, a medium pressure natural gas pipeline, a gas pipeline of a gas distribution station, a gas pipeline of a power station, a boiler house and a borehole of a natural gas production site, etc.

5. The power installation of claim 2 further comprising an exchanger-refrigerator installed at the outlet of the low pressure gas expansion machine.

6. The power installation of claim 2, wherein the rotors of the gas expansion machines are kinematically unconnected with each other, the rotor of each gas expansion machine is kinematically connected with a rotors of converter of mechanical energy.

7. The power installation of claim 2, wherein the rotors of the gas expansion machines are kinematically connected with each other, the rotors of each gas expansion machine is kinematically connected with a rotor of converter of mechanical energy.

8. The power installation of claim 2, wherein
the rotors of the gas expansion machines are kinematically connected with each other,
the rotors of each gas expansion machine is kinematically connected with rotor of at least one one converter of mechanical energy.

9. The improvement of the power installation according to claim 2, wherein the rotors of the gas expansion machines are kinematically unconnected with each other; the rotors of the each gas expansion machine is kinematically connected with at least one rotor of converter of mechanical energy.

10. The improvement of the power installation according to claim 2, wherein the rotors of the gas expansion machines are mechanically unconnected with each other; the rotor of each gas expansion machine is mechanically connected with rotor of converter of mechanical energy.

11. The improvement of the power installation according to claim 2, wherein the rotors of the gas expansion machines are mechanically unconnected with each other; the rotor of the gas expansion machines is mechanically connected with rotor of converter of mechanical energy.

12. The improvement of the power installation according to claim 2, wherein the rotors of the gas expansion machines are mechanically connected with each other; the rotor of the gas expansion machine is mechanically connected with at least one converter of mechanical energy.

13. An improvement of the power installation according to claim 2 wherein
the rotors of the gas expansion machines are kinematically connected with each other;
the rotors of the gas expansion machines are kinematically connected with rotor of at least one converter of mechanical energy.

14. The power installation of claim 2 further comprising an exchanger-refrigerator installed at the outlet of the low pressure gas expansion machine.

* * * * *